June 23, 1964 D. B. MILLER 3,138,653

TELEPHONE CABLE TAP

Filed June 20, 1960

Daniel B. Miller
INVENTOR.

BY Ramsey and Kolisch
Attys.

United States Patent Office 3,138,653
Patented June 23, 1964

3,138,653
TELEPHONE CABLE TAP
Daniel B. Miller, 1214 SE. Malden, Portland 2, Oreg.
Filed June 20, 1960, Ser. No. 37,353
5 Claims. (Cl. 174—44)

This invention relates to a construction for tapping the conductors of a cable, and improvements in terminal devices that may be used in the tapping of such conductors. The invention has particular utility for telephone companies, where it may be used in the connection of the usual telephone "drop wire" (i.e., the line that runs from the telephone cable to the telephone set of a subscriber) to a telephone cable. Through use of the invention, substantial savings in the time required to install a telephone set are possible. Further, savings in the cost of parts are possible since the terminal device and associated parts of the invention are simply constructed and can be manufactured at low cost.

A typical telephone cable is made up of plural paired wires or conductors, known in the industry as "cable pairs," bundled together. Each cable pair comprises an insulated wire that is grounded, and referred to as the "tip side" of the pair, and an insulated wire that is charged, and referred to as the "ring side" of the pair. The conventional way of connecting a telephone drop wire to a cable pair has comprised cutting the two wires of the cable pair, and connecting the severed ends that result to a terminal block mounted in spaced relation to the telephone cable using "pig taails" running from the wire ends to the terminal block. Satisfactory electrical connections are possible using the system, but the system has several disadvantages. For one thing, a rather complicated and expensive terminal block is required, and means must be provided for suitably mounting this in spaced relation to the telephone cable. A considerable number of electrical connections must be made, since one set of ends of the pig tails must be connected to the ends of the wires of the cable pair, and the other set of ends must be suitably connected to the terminal block. In this connection, it should be remembered that freedom of movement is often limited when working on a suspended cable. A serious disadvantage is that the system has required the cutting of the wires of a pair, which may interrupt the service of other users if the wrong pair are cut. To insure continuous and reliable service, it is not uncommon for telephone companies to have the rule that if an error is made in the cutting of a cable pair, either through a mistake in information or through inadvertence, a special man shall be dispatched to the source of the trouble to determine what caused the error. Interruption in service has also sometimes resulted through inadvertent shorting of conductors through the exposed lug terminals ordinarily found in the usual terminal block.

According to this invention, a novel form of terminal block is connected to the wires or conductors of a cable pair without severing the wires. The wires thus pass continuously through the terminal block, and electrical connection is made with the wires by mechanism within the terminal block that crushes or pierces the insulation of the wires. The block itself is suspended in an installation by the cable pair with which connection is being made. The construction makes unnecessary the use of pig tails, or a complex terminal block mounted in spaced relation to the telephone cable. As contemplated by this invention, a telephone drop wire is connected to the suspended terminal block by means of a connector device connected to an end of the drop wire having pins that fit within receiving jacks provided the terminal block, with the connector device suitably mounted in place. The jacks are shielded by recessing them within the terminal block.

Tension in the drop wire is isolated from the connection of the connector device with the terminal block as by securing the wire adjacent its ends to the usual telephone pole. The invention features a construction where electrical connections are made with the various conductors without the use of lugs or similar parts that are exposed so that shorting is a possibility.

A general object of the invention, therefore, is to provide a novel construction for tapping the wires of a cable pair wherein electrical connections with the wires of the pair may be made simply and quickly.

Another general object of the invention is to provide an improved construction for tapping the wires or conductors of a cable pair in a telephone cable, where the wires of the pair are not severed, and electrical connection with the wires is made by the use of a terminal block that surrounds the wires passing continuously through the block.

Another object is to provide an improved construction for a terminal block that is free of exposed terminals that could be inadvertently shorted, and that employs crushing devices within the terminal block for making electrical connections with conductors.

A further object is to provide a novel construction for tapping the wires of a cable pair, where pin and jack connections are used to connect the end of a telephone drop wire to terminals in a block electrically connected to the wires of a cable pair.

Still another object is to provide improvements in terminal block construction that make mounting of the block in place on a wire relatively easy.

Other objects and advantages are attained by the invention, which is described hereinbelow in conjunction with the accompanying drawings, wherein.

Figure 1:
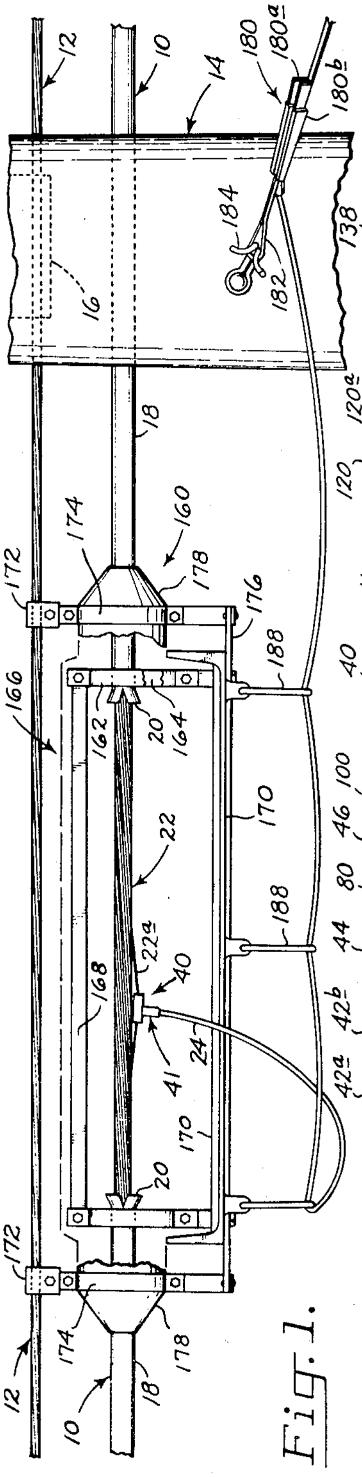
FIG. 1 is a view illustrating portions of a typical telephone cable, supported on a pole by means of a messenger strand, such telephone cable containing plural cable pairs adapted to be connected to a telephone drop wire, and showing a terminal block and plug-type connector connecting one cable pair to a drop wire as contemplated by the invention.

Referring now to the drawings, and with particular reference to FIG. 1, a telephone cable is indicated at 10, and extending along above cable 10 is a messenger strand 12 that supports the cable as it runs between the usual telephone poles 14. Messenger strand 12 is secured to pole 14 in a conventional manner, using the support indicated at 16. The portions of the cable and messenger strand illustrated in FIG. 1, are separated from each other, as is customarily done when connecting a telephone drop wire to the cable.

Figures 2, 4:
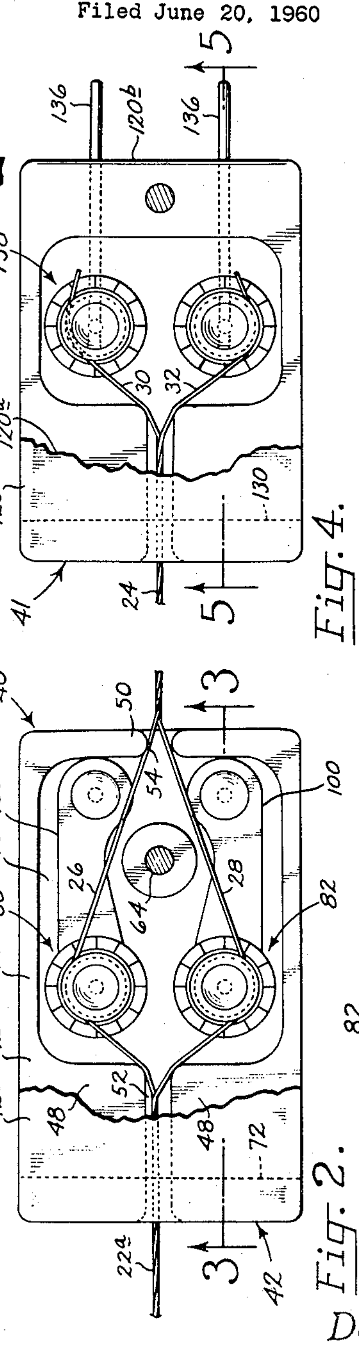
FIG. 2 illustrates the terminal block, slightly enlarged, and with portions broken away.
FIG. 4 illustrates the plug-type connector used in the construction, slightly enlarged and with portions broken away.

Cable 10 includes a covering 18 cut away at 20 to expose a bundle of cable pairs, indicated generally at 22, which make up the major portion of the cable. In the embodiment of the invention shown, one of the cable pairs 22a has been pulled out of the bundle of cable pairs, to make it accessible for the connection of a drop wire 24 thereto. With reference now to FIGS. 2 and 4, it will be noted that cable pair 22a comprises two conductors or wires 26, 28. Each conductor is provided with the usual sheath of insulation material. One of the conductors of the cable pair is connected to ground, and the other is a charged conductor. Drop wire 24 also comprises two conductors or wires 30, 32 sheathed in insulation material. The drop wire connects the usual telephone set (which may be located, for instance, in the house of a subscriber) to the conductors of a cable pair. In tapping cable pair 22*a*, one of the wires 30, 32 is connected to the charged conductor of the cable pair, and the other of the wires 30, 32 is connected to the ground conductor of the cable pair. The connections are made using terminal block 40 and plug-type connector 41.

Figures 3, 5:
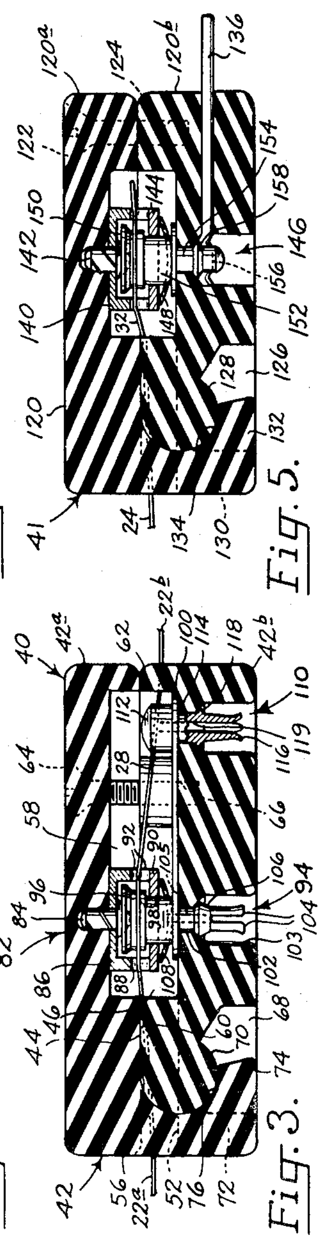
FIG. 3 is a section view, taken along the line 3—3 in FIG. 2.
FIG. 5 is a section view, taken along the line 5—5 in FIG. 4.

Referring now to FIGS. 2 and 3, terminal block 40 comprises a housing 42 of nonconductive material, having elongated upper and lower housing parts 42*a*, 42*b*. A dielectric, plastic material is well suited for the construction of the housing, since such material has the requisite electrical properties, and in addition is relatively light in weight. Housing parts 42*a*, 42*b* in the operative position shown are detachably joined together with the upper part fitted over and in complementary relation to the lower part. As will be described, they may be separated and disconnected from each other to expose the inside of the housing, when preparing to tap the wires of a cable pair.

Lower housing part 42*b* has a substantially rectangular outline in plan. Extending downwardly from top 44 of the lower housing part is a shallow recess 46. Extending longitudinally along the top of the part, and through flange portions 48, 50 defining the ends of the recess 46, are grooves 52, 54. These grooves, together with recess 46, provide a continuous passage extending through housing 42 receiving the wires of cable pair 22*a*. With upper parts 42*a* removed, this passage is completely opened at one side along its entire length, whereby the continuous wires of the cable pair may be positioned in the passage without severing the wires and with the wires protruding out from the ends of the housing.

Considering the upper part 42*a*, this has extending upwardly from its bottom 56 a recess 58 complementing recess 46 of the lower part. Flange portions 60, 62 defining the ends of recess 58 fit over flange portions 48, 50, and cover grooves 52, 54 thus to close off the ends of the passage receiving the wires of the cable pair. The two parts are detachably joined together in the operative position of FIGS. 2 and 3 by means of a screw 64 extending from the top housing part adjacent one end into an internally threaded bore 66 provided the lower housing part.

Disengageable pivot means is provided pivotally connecting the upper and lower housing parts adjacent one set of ends, whereby the upper part may be swung down on the lower part when fitting the two together. This swinging of the two parts relative to each other is relied upon to produce a leverage action in the parts of the housing for actuating clamping mechanism making electrical contact with the wires of the cable pair by means of crushing devices, as will be described. Describing the pivot means, beneath groove 52 of the lower part 42*b* is a notch 68 with inner extremities defined by a wall 70 that curves in a circular sweep. Upper part 42*a* is provided with shoulder 72 along its left lower end in FIG. 3, and midway between the ends of the shoulder is a finger 74 integral with the shoulder that protrudes to the right in FIG. 3. A wall 76 defining upper extremities of the finger is curved in a circular concave sweep that complements the curvature of wall 70. With screw 64 removed, the upper part may be swung upwardly with wall 76 sliding on wall 70. The upper housing part may be entirely disconnected by shifting it longitudinally and to the left in FIGS. 2 and 3.

Terminal block 40 also comprises a pair of metal clamping mechanisms 80, 82 for clamping onto portions of the conductors of the cable pair. These crush the insulation of the conductors and make electrical contact with the conductors. The clamp mechanisms are similar, and only one is described in detail.

Thus, and with reference to mechanism 82, secured to the upper housing part by a drive screw 84 is a cupped crush washer or crushing device 86. This is provided with a serrated lower edge 88. Mounted opposite and beneath crush washer 86 is a mating crush washer or crushing device 90 provided with a serrated upper edge 92. With the housing parts swung together and joined, the two crush washers are urged together against any wire passed therebetween, and the serrated edges of the washers pierce the insulation of the wire.

Lower crush washer 90 is mounted in place in the lower housing part by means of a fitting 94. Integral with fitting 94 is an upper retaining flange 96 limiting upward shifting of lower washer 90, an annular collar portion 98 extending through the center of crush washer 90 and with its lower edge thereof abutting a metal strip 100, a stem portion 102 extending through the bottom of the housing part, and grip fingers 104 forming part of a terminal or jack for receiving the protruding pin of a plug-type connector. A bore 105 in the fitting aligned with the space between fingers 104 receives the end of such a pin. Fitting 94 is secured to the lower housing part by a turned-down rivet flange 106. The terminal or jack just described constitutes a means accessible from the exterior of the housing for the detachable attachment of a tapping conductor to the terminal block. The jack is mounted with a recess 103 and shielded by the wall portions defining the recess. This feature protects against inadvertent shorting.

A bias means is provided that bears against one of the crush washers to urge it against the other while enabling it to give slightly with respect to said other so that a wire passing between the washers may not be inadvertently severed or the housing unduly strained. Thus, and with reference to FIG. 3, 108 indicates a spring washer bearing on lower crush washer 90 and encircling collar portion 98. In operative position, the washer is flattened somewhat, with crush washer 90 moving downwardly on collar 98.

Each of the clamp mechanisms is provided with the jack at the base of the housing described, and these jacks accommodate the connection of two conductors to the wires of a cable pair. When installing a two-party line, it is necessary that an additional drop wire be connected to the conductors of the cable pair. Metal strips 100 of the clamp mechanisms extend over the bottom of recess 46 to the right in FIGS. 2 and 3, where they connect with fittings 110. Each of these comprises a head portion 112, and integral therewith a stem portion 114, grip fingers 116, and rivet flange 118, similar to those discussed in connection with fittings 94. The grip fingers, together with a bore 119, provide another jack accessible from the outside of the housing electrically connected to a wire of a cable pair, used when installing a two-party line.

A plug-type connector 41 illustrated in FIGS. 4 and 5 is used to connect the wires of a drop wire to terminal block 40. The connector comprises a housing 120 having housing parts 120*a*, and 120*b*. The two housing parts are detachably secured together by a screw 122 turned into an internally threaded bore 124. The housing parts are pivotally interconnected by disengageable pivot means similar to that provide parts 42*a*, 42*b*. Thus, lower part 120*b* has a notch 126 with inner extremities defined by a wall 128 that curves in a circular sweep. Upper part 120*a* has a flange 130, and integral with the flange is a finger 132 with an upper wall 134 that curves in a sweep complementing the curvature of wall 128. The two curving walls slide on each other during relative pivoted movement of the parts.

Connector 41 includes pins 136 projecting from one end thereof that are electrically connected to the wires of drop wire 24 by clamp mechanisms 138 somewhat similar to clamp mechanisms 80, 82.

Describing a clamp mechanism 138, each comprises a cupped crush washer 140 secured to the top housing part by a drive screw 142, and opposite washer 140 a crush washer 144 mounted through a fitting 146 on the lower housing part 120*b*. A spring washer 148 urges the lower crush washer upwardly against the upper one. Fitting 146 includes a flange portion 150 limiting upward movement of the lower crush washer, a collar portion 152 extending downwardly through crush washer 144, and a stem portion 154 projecting through the bottom of the lower housing part. A pin 136 is connected to stem portion 154 by inserting its inner end through a bore 156 provided the stem portion, and the entire assembly is made fast by turning over rivet flange 158 and crimping the inner end of pin 136.

Referring again to FIG. 1, 160 indicates a suspended frame used to mount a cover over the terminal block and connector, and to guide drop wire 24 to its connection with the terminal block. The frame comprises opposed clamps 162, 164 of an inner cover support 166 secured to the telephone cable at each end of where covering 18 is cut away. Connecting the clamps is a tie rod 168 and a base bar 170. Supported on messenger strand 12 by hangers 172 are cover guard straps 174. Straps 174 support the inner cover support 166 through bar 176 connecting support 166 to straps 174. A cover 178 is mounted in place by fitting it over the cover support 166 and placing its ends between cover guard straps 174, as indicated by viewing the portions of the cover shown at the left in FIG. 1.

Drop wire 24, adjacent the end that is connected to connector 41, is secured to pole 14 by means of a drop wire clamp 180 with parts 180*a*, 180*b* that wedge against portions of the wire extending therebetween. Wire clamp 180 also includes a loop 182, and this is held by a drop wire hook 184 that is secured to the post. The drop wire, progressing from wire clamp 180, passes through brackets 188 depending from cover support 166, and thence it is looped around a bracket before extending upwardly to terminal block 40. The wire clamp constitutes a tension-relieving means that isolates any tension in the main body of the drop wire from the connection of the connector with the terminal block, so that these two parts stay in place without being pulled apart.

According to this invention, it will be seen that it is a relatively simple matter to attach the terminal block to the wires of a cable pair. First the cable pair is pulled slightly from the bundle of pairs making up the telephone cable, and after unscrewing screw 64, the housing parts of the terminal block housing are disconnected. The wires of the cable pair are then unraveled, as shown in FIG. 3, and each wire or conductor is passed between the pair of opposed crush washers of a clamping mechanism. The cable pair on each side of the clamping mechanisms is placed in grooves 52, 59. With the wires in place, the upper part of the terminal block housing is swung down over the lower part, after first engaging the disengageable pivot means (which has the effect of closing off groove 52 so that the portion of the cable pair within the groove is confined in place). Screw 64 may then be tightened. With the parts in operative position, the crush washers are brought together against the insulation of the conductors of the cable pair. Note that the crush washers are between the pivot means and the screw which places them in a good position to have leverage applied thereto. The housing parts of connector 41 are as easily brought together on the ends of a drop wire.

There are no exposed terminals that may be easily shorted in the terminal block. The plug-type connector is readily mounted in place on the terminal block, and can as easily be removed. Assembled, the terminal block and connector are suspended by the cable pair, without the need of a separate mounting for the parts. There are no pig tails extending from a severed cable pair to a terminal spaced from the cable. Accidental interruption of service is prevented.

It is claimed and desired to secure by Letters Patent:

1. In combination with a pole and a telephone cable suspended therefrom, a construction for connecting the two conductors of a drop wire for a telephone to the two conductors of a cable pair in the telephone cable comprising; a terminal device having a housing of nonconducting material suspended by the cable pair with the conductors of the pair passing continuously and without interruption through the housing of the device; said terminal device having a pair of jacks accessible from the exterior of the device, and means electrically connecting each jack to a conductor of the cable pair including mechanism making electrical connection with the conductor without severing the same; a connector device including a pair of pins and a housing of nonconductive material mounting the pins; said connector device being detachably mounted on said terminal device with a pin received in each jack so that the mounting is by pin and jack connections; said connector device carrying an end of the drop wire and including means electrically connecting the conductors of the drop wire to its pins, one to each pin; and tension-relieving means adjacent the end of the drop wire that is carried by the connector device securing the drop wire to the pole.

2. In combination with a suspended telephone cable, a construction for connecting the two conductors of a drop wire for a telephone to the two conductors of a cable pair in the telephone cable comprising; a terminal device having a housing of nonconducting material suspended by the cable pair with the conductors of the pair passing continuously and without interruption through the housing of the device; said terminal device having a pair of terminals, and means electrically connecting each terminal to a conductor of the cable pair including clamping mechanism making electrical connection with the conductor without severing the same; a connector device having a housing of nonconducting material detachably mounted on said terminal device; said connector device carrying an end of the drop wire and including means electrically connecting the conductors of the drop wire to the terminals of the terminal device, one to each terminal; and tension-relieving means adjacent the end of the drop wire carried by the connector device holding the drop wire independently of said cable pair.

3. In combination with a pole-suspended cable having multiple cable pairs with each cable pair comprising a pair of conductors; a drop wire comprising at least another pair of conductors; means electrically connecting the pair of conductors of the drop wire to the pair of conductors of a cable pair comprising a terminal device of light mass including a housing secured to the cable pair with the device and its housing suspended by the cable pair, and a pin and jack-type connection connecting the conductors of said drop wire and said terminal; and means secured to the drop wire supporting the weight of the drop wire and spaced along the length of the drop wire from said pin and jack-type connection.

4. In combination with a pole-suspended cable having multiple cable pairs with each cable pair comprising a pair of conductors; a drop wire comprising at least another pair of conductors; means electrically connecting the pair of conductors of the drop wire to the pair of conductors of a cable pair comprising a terminal device of light mass including a housing secured to the cable pair with the device and its housing suspended by the cable pair, at least a pair of jacks accessible from the exterior of the housing and electrically connected within the housing to the conductors of the cable pair, and means making a pin and jack-type connection of the conductors of the cable pair with said pair of jacks; and means secured to the drop wire supporting the weight of the drop wire and spaced along the length of the drop wire from said pin and jack-type connection.

5. In combination with a pole-suspended cable having multiple cable pairs with each cable pair comprising a pair of conductors; a drop wire comprising at least another pair of conductors; means electrically connecting the pair of conductors of the drop wire to thep air of conductors of one of said cable pairs; said means comprising a terminal device including a housing, said housing being suspended on said one cable pair independently of other cable pairs in said cable with the conductors of said one cable pair extending continuously through the housing, and means mounted on said housing electrically joining the conductors of said one cable pair and the pair of conductors of said dropwire; and means secured to the dropwire adjacent where it is electrically connected to the conductors of the cable pair supporting the weight of the drop wire.

References Cited in the file of this patent

UNITED STATES PATENTS

| | | |
|---|---|---|
| 1,675,602 | Faust | July 3, 1928 |
| 1,812,396 | Eckstein | June 30, 1931 |
| 1,818,884 | Eckstein | Aug. 11, 1931 |
| 2,084,953 | Gibson | June 22, 1937 |
| 2,590,886 | Pedersen | Apr. 1, 1952 |
| 2,683,304 | Channell | July 13, 1954 |
| 2,735,078 | Greenbaum | Feb. 14, 1956 |

FOREIGN PATENTS

| | | |
|---|---|---|
| 766,017 | Great Britain | Jan. 16, 1957 |